Jan. 22, 1924.

W. F. CHRISTEL 1,481,455

GREEN PEA VINER

Filed Oct. 20, 1923

INVENTOR
William F Christel
BY
Wm. F. Bissing
ATTORNEY

Patented Jan. 22, 1924.

1,481,455

UNITED STATES PATENT OFFICE.

WILLIAM F. CHRISTEL, OF VALDERS, WISCONSIN, ASSIGNOR TO CHISHOLM-SCOTT COMPANY, OF COLUMBUS, OHIO.

GREEN-PEA VINER.

Application filed October 20, 1923. Serial No. 669,754.

*To all whom it may concern:*

Be it known that I, WILLIAM F. CHRISTEL, a citizen of the United States, residing at Valders, State of Wisconsin, and whose post-office address is care of Valders Canning Co., Valders, Wisconsin, have invented certain new and useful Improvements in Green-Pea Viners, of which the following is a specification.

A green pea vine huller or viner, as it is usually called, consists of an outer, open-ended slowly rotating cylinder having elevating devices on its inner periphery, into which cylinder green pea vines which are brought from the fields are fed, and a rapidly revolving, beater-carrying drum on the inside of the cylinder acting to impact the vines and pea pods thereon after these have been raised by the elevating devices and dropped into the path of the beaters, thus opening the pods and permitting the peas to escape. A sieve, sometimes called a screen, which constitutes the surface of the cylinder is provided with apertures of a size to permit the peas once hulled, to quickly escape but to retain the vines and most of the débris which passes to and through the discharge end of the cylinder.

Now one critical problem in green pea viners is to injure as few peas as possible. In consequence, the normal sized apertures in the sieve are always made as large as possible up to the point at which too much of the débris escapes, the art teaching that if a pea, once out of the pod is again struck by the beater, it is mashed and this diminishes the value of the product. As a result, these apertures are made so large that many filled pea pods, which have been torn from the vines, are constantly escaping thru them and are either lost or have to be collected by devices especially provided for that purpose.

I have found, however, that the unhulled pods mostly escape from the cylinder at its feed end, this being probably due to the fact that many of their connections with the vines become severed by the instrumentalities usually employed for feeding the vines into the cylinder and also because such connections as are especially weak are broken by the beaters quite early in their passage through the cylinder. I have also discovered that it is possible, near the feed end to reduce the size of the sieve apertures below the normal size employed in the body of the sieve to a point which will not permit the detached but filled pods to escape and this without markedly increasing the number of injured peas. The object is to prevent whole pods from passing through the screen and being wasted. By retaining the unhulled pods in the viner cylinder at the feed end for a longer period of time, I hull out many pods which would otherwise have passed out and been wasted. The fact that the hulled peas are not damaged by being struck again at this point may be due to the vines in the feed end being in a state of aggregation which causes them to act as cushions for the hulled peas embedded therein thus protecting them from the beater whereas, later on in the hulling process, the vines are thinned out and are no longer in condition to act as such cushion for the hulled berries. The result is all that concerns us here. As a consequence, by my invention, I am enabled to prevent the escape of many filled pods, severed from the vines and thus cause them to be hulled within the cylinder and this without considerably increasing the percentage of injured peas.

Figure 4:
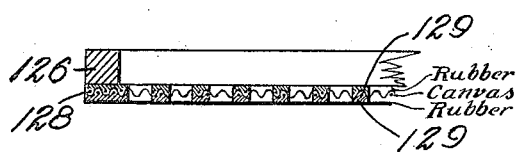

Fig. 4, an enlarged detail of the material usually employed for the screen.

The outer cylinder, or more accurately hexagonal prism, the two words being used interchangeably herein, consists of two circular end rings 1, mounted to rotate on travellers 11, being driven by a pulley and chain 3. Connecting the two circular end rings 1 are six elevating ribs 10 upon which are mounted six rectangular frames 126 each covered with a sieve 127. The rapidly revolving inner drum 2 carries beaters 12, which are slanted so as to feed the impacted vines towards the discharge end. All this is old and common in the art. So, too, is the endless apron 33 mounted on prismatic rollers 30, 31, which acts to carry the débris to its upper edge and permits the spherical peas to roll down into the pea box 32, which as usual extends from the feed to the discharge end of the machine.

Figure 1:
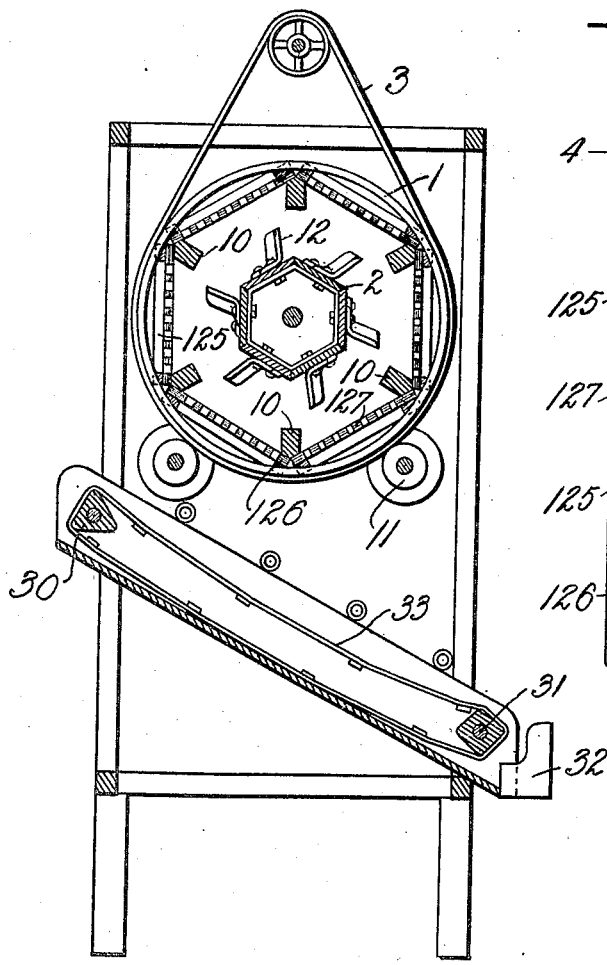
Fig. 1 is a vertical cross section of a green pea viner.
Figures 2, 3:
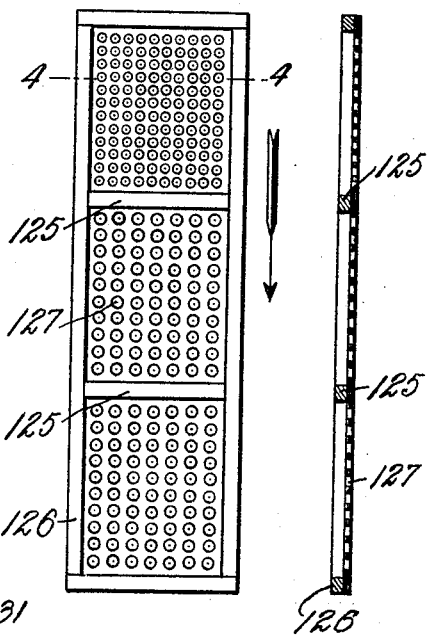
Fig. 2, is a plan of a viner-sieve and its supporting frame.
Fig. 3, is a cross section of one form of sieve.

The rectangular frame 126 with its cross bars 125 carries the perforated screen 127 which is preferably made of a canvas body 128 covered with closely adhering rubber sheeting 129 on each side of the canvas. But, as before explained, instead of having the apertures in the screen all of the usual normal size, those apertures near the feed end, say the first third, are smaller in size than the normal, which means, if of circular shape, that they are of smaller diameter than the apertures in the body of the screen. I have found circular apertures of one half inch diameter to be suitable for the feed end holes. The usual or normal size of hole is five eighths of an inch in diameter and this I employ for the rest of the screen. These differences in sizes have been exaggerated in the drawings. The arrow in Fig. 3 shows the direction in which the pea vines pass along the screen from feed to discharge ends.

I claim:

A green pea viner comprising an outer, open-ended, slowly rotating cylinder having elevating devices on its inner periphery and covered by perforated screens, the size of the perforations at the feed end being smaller than the normal size of perforations for the rest of the screen; a rapidly revolving beater-carrying drum within the outer cylinder; and an apron extending from feed to the discharge end of the cylinder for separating the hulled peas from the refuse, substantially as described.

In testimony whereof, I have signed my name to this specification.

WM. F. CHRISTEL.